Fig. 1

June 30, 1959  H. W. HORLACHER, JR  2,892,920
TERMINAL WELDING AND STAKING MACHINE
Filed July 31, 1956  6 Sheets-Sheet 3

INVENTOR
HARRY W. HORLACHER, JR.
BY Francis J. Klempay
ATTORNEY

June 30, 1959     H. W. HORLACHER, JR     2,892,920

TERMINAL WELDING AND STAKING MACHINE

Filed July 31, 1956     6 Sheets-Sheet 4

FIG. 5

INVENTOR

HARRY W. HORLACHER, JR.

BY Francis J. Klempay

ATTORNEY

INVENTOR
HARRY W. HORLACHER, JR.
BY Francis J. Klempay
ATTORNEY

United States Patent Office 2,892,920
Patented June 30, 1959

2,892,920

TERMINAL WELDING AND STAKING MACHINE

Harry W. Horlacher, Jr., Warren, Ohio, assignor to The Taylor-Winfield Corporation, Warren, Ohio, a corporation of Ohio Application July 31, 1956, Serial No. 601,153

13 Claims. (Cl. 219—79)

This invention relates to apparatus for automatically attaching electrical terminals to the ends of flexible insulated conductors. As will be hereinafter more fully explained and described, the machine of the invention is adapted to feed a strip of preformed electrical terminals to a station where a piece of wire is welded to each terminal and then move the terminals to another region where the terminals are crimped around the wires and the individual terminals are separated from each other.

Although there have been various mechanisms advanced in the prior art for welding or soldering pieces of wire to strips of preformed electrical terminals, such apparatus has been characterized by its extremely large size and complicated mechanical arrangements which have seriously limited the employment and utilization of such apparatus.

It should also be understood that for high-speed operations the various steps of feeding, welding and staking and cut-off must be performed with great rapidity in a very accurate manner. This is particularly true since the terminals are relatively small in size and even the slightest inaccuracy is likely to result in a completely unacceptable final product. Many of the prior art machines have been unable to meet these exacting specifications of extreme precision in their operation during sustained and continuous usage.

Further, many of the machines and mechanisms advanced in the prior art are adapted for working only one type of connector or terminal. Although such a machine may be acceptable where huge quantities of identical terminals are required, they are not adapted for an installation where various sized and shaped terminals are to be worked. All of the above limitations have generally restricted the utilization of such machines to a relatively few installations.

It is therefore the main object of the present invention to provide an improved terminal welding and staking machine which is rugged and compact in construction but yet extremely accurate in its operations to thereby allow sustained and continuous operation. The feeding, welding and staking and cut-off stations are in close-coupled relation whereby the overall size of the machine is considerably smaller and more compact than apparatus heretofore employed. This result is obtained by a novel arrangement of the component parts in a generally nesting and cooperating relation.

A further important object of the invention is to provide a machine of the character described which is extremely versatile in its operation whereby many different sized and shaped terminals may be attached to pieces of wire. The length of the intermittent feed and various other important functions of the machine are readily and easily adjustable for various preformed terminals.

Yet another object of the invention is to provide improved apparatus for precisely controlling the operations of the terminal welding and staking machine. As will be more fully explained, the entire operation of the machine is preferably under the control of and actuated in response to a sequence timer so that extremely accurate high-speed operations are afforded.

A further object of the invention is to provide improved means for actuating the feeding and staking and cut-off mechanisms of the terminal welding and staking machine whereby these mechanisms are alternately driven from a common source and any chance of misfunctioning of these components is substantially eliminated.

Another object of the invention is to provide apparatus having the characteristics outlined above which is particularized by its simplicity in construction and operation.

The above as well as other objects and advantages of the invention will become more readily apparent upon consideration of the following detailed specification and accompanying drawing wherein there is described and shown a representative embodiment of the invention.

Figure 1:
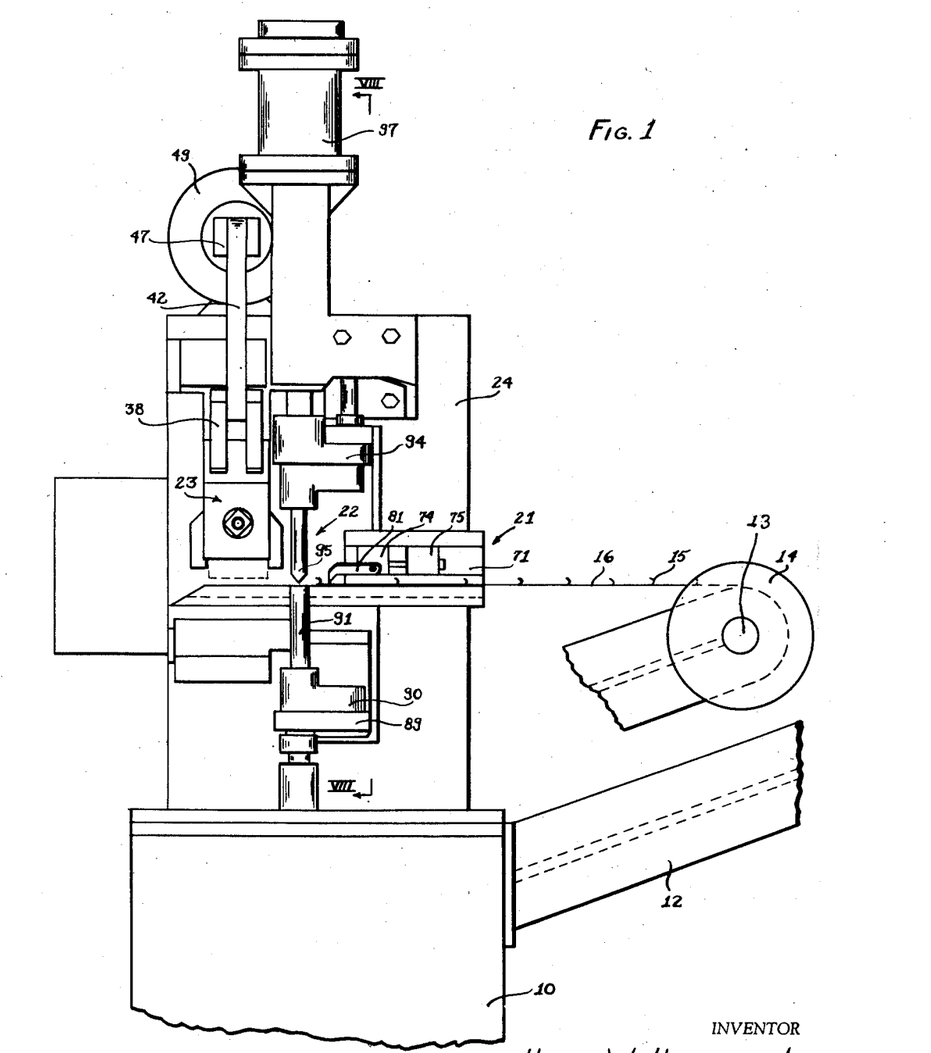
Figure 1 is a front view of a terminal welding and staking machine constructed in accordance with the teachings of the present invention.
Figure 9:
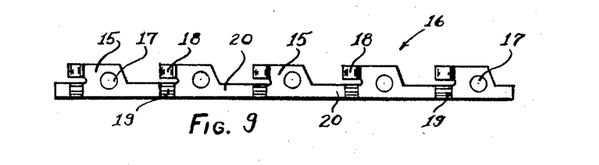
Figure 9 is a plan view of a strip of terminals adapted to be attached to pieces of wire.

Referring now to the drawing, and initially to Figure 1 thereof, the terminal welding and staking machine of the present invention is shown to be supported on a base 10 which is adapted to rest on the floor of a plant, for example. Rigidly attached to the base 10 is a laterally extending bracket 12 which rotatably supports a rod 13 on its far end that serves as an axle for a reel 14 of preformed terminals 15 integrally joined in end-to-end relation to form a continuous strip of terminals 16. In Figure 9 of the drawing there is shown a section of such a strip, each of the terminals 15 having an aperture 17 in one end thereof while the other end is split and has a small ferrule 18 and a serrated portion 19. The terminals are joined to each other by the integral metal tabs 20 to form the strip of terminals 16.

The strip of terminals 16 is adapted to be intermittently moved by feeding mechanism 21 to a welding station 22 where a piece of wire is welded to the serrated portion 19 of each of the terminals 15 and then to a staking and cut-off station 23 where the ferrule 18 is clamped tightly around the wire and the integral metal tabs 20 are removed. The result of these operations can be seen in Figure 10 where there is shown a single completed terminal 15 which has been welded to a piece of wire and has been separated from the strip of terminals 16.

Figure 10:
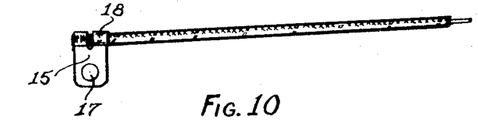
Figure 10 is a view of a completed terminal.

It should be understood from the outset that the specific terminal shown in Figures 9 and 10 is meant to be representative only since the apparatus of the present invention is adapted to work many other sized and shaped terminals. This will be particularly apparent upon further consideration of the specification where the adjustable features of the apparatus are considered in detail. These features are an important part of the apparatus in that they greatly increase the versatility of the same.

The feeding, welding and staking and cut-off mechanisms of the terminal welding and staking machine are supported from a main frame 24 having the irregular configuration shown in the various figures of the drawing. The left side of the main frame 24 is covered by a vertically extending U-shaped member 25 positioned above the pass line of the strip of terminals 16. Rigidly attached to the end of the U-shaped member 25, by means of a plurality of bolts 26, are a pair of parallel and vertically extending plates 27 which form ways 28 for a generally T-shaped slide 29. Bolted to the forward face of the T-shaped slide 29 by bolts 30 is a die-mounting block 31 having an enlarged lower end portion substantially as shown. The die-mounting block is machined to provide a die-mounting recess 32 which is adapted to receive the proper staking and cut-off dies needed for any given type of terminal being welded and staked. Such dies are represented schematically in the drawing by the area enclosed by a broken line 33. The various dies mounted in the mounting block 31 have been omitted since they do not form any part of the present invention and such dies are well known to those skilled in the metal working and forming art. A cover plate 34 is provided to cover the dies (Figure 3) and means may be incorporated, such as a threaded rod 35 and a fitting 36 operating through various wedges, not shown, to allow limited vertical adjustment of the staking and cut-off die assembly.

Figure 2:
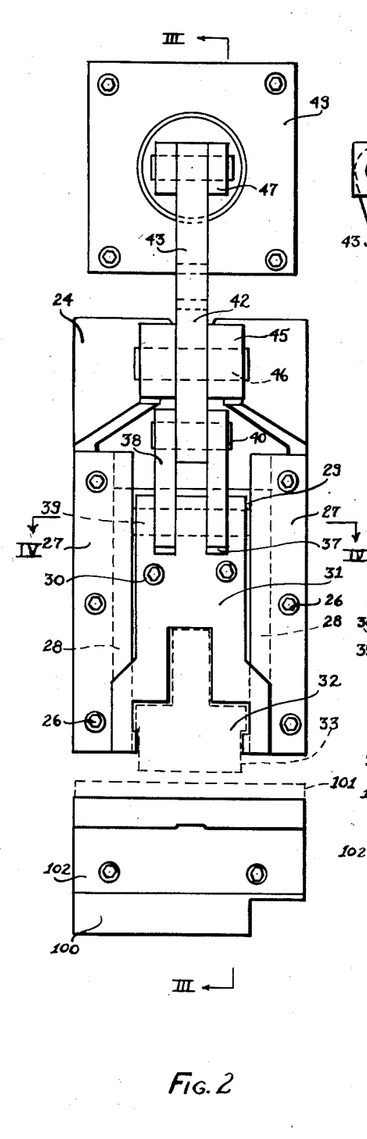
Figure 2 is a partial front view showing the general construction of the staking and cut-off apparatus of the invention.

The upper portion of the die mounting block 31 is machined to form a pair of rectangular openings 37 which are adapted to slidably receive the parallel links 38. The links 38 are pivoted to the die mounting block 31 by a through pin 39 and are pivotally connected by a pin 40 to an arm 41 of a bellcrank 42. The bellcrank 42 is of the conventional type having arms 41, 43 and 44 and is pivotally mounted between a clevis 45 by a pin 46 at the point of juncture of the various bellcrank arms. The arm 43 of the bellcrank is attached at its extreme end to a clevis-like fitting 47 which is in turn rigidly connected to an operating piston rod 48 of a fluid cylinder 49. The fluid cylinder is mounted horizontally on the top of the main frame 24 by any suitable pivotal mounting means, not specifically shown. It will thus be apparent that upon appropriate actuation of the fluid cylinder 49 that the bellcrank 42 will be forced to pivot about the pin 46 to alternately move the links 38 out of alignment with respect to the die mounting block 31 and cause this member, as well as the dies associated therewith, to reciprocate in the ways 28. The dies are operative to stake and cut-off the individual terminals on the down stroke of the die mounting block when the bellcrank 42 is in the position shown in Figure 2 of the drawing.

It will be noted that when the bellcrank is pivoted about the pin 46 in such a manner that the arm 41 is moving in an upward arc the arm 44 is moving in a larger downward arc due to its position with respect to the pin 46 and the radial length of this arm. In the present invention the arm 44 is utilized to operate the feeding mechanism 21, through suitable linkage means to be hereinafter more fully described, and the arrangement is such that the feeding mechanism is operative to feed the strip of terminals when the arm 44 is moving in a downward direction. Therefore, when the fluid cylinder 49 is actuated either the staking and cut-off assembly or the feeding mechanism is performing its assigned function and when the cylinder is actuated in the other direction the other mechanism performs its operative function. In this manner it is possible to precisely and accurately control the synchronization of these two assemblies.

Figure 5:
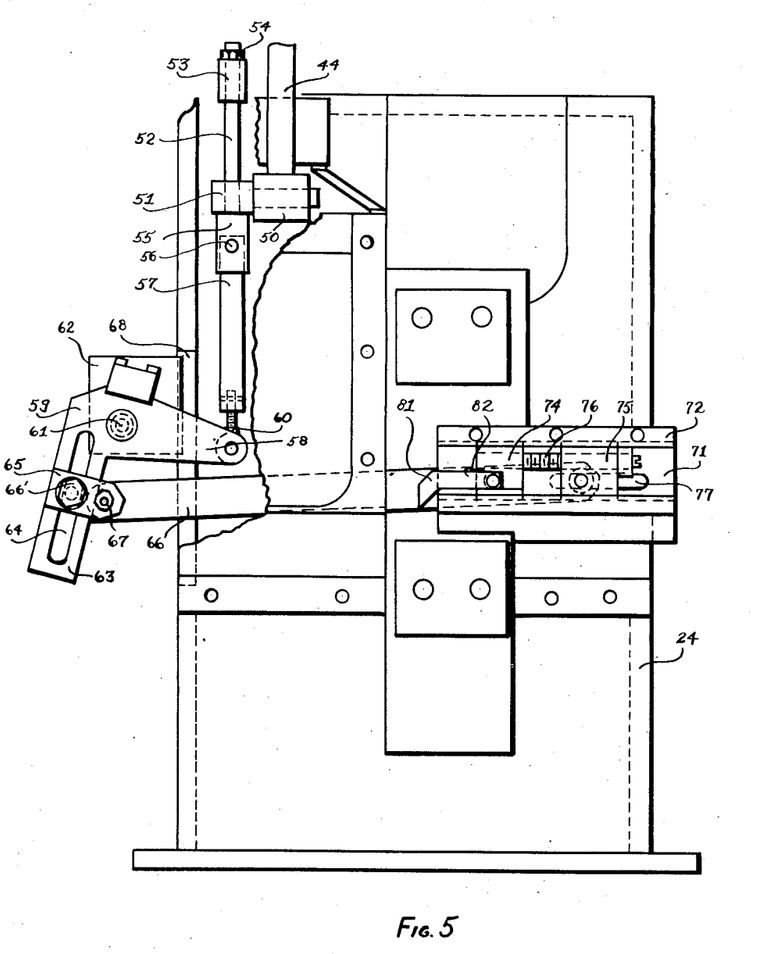
Figure 5 is a front view, partially in section, of the terminal feeding mechanism and driving linkage therefor utilized in the apparatus.
Figure 6:
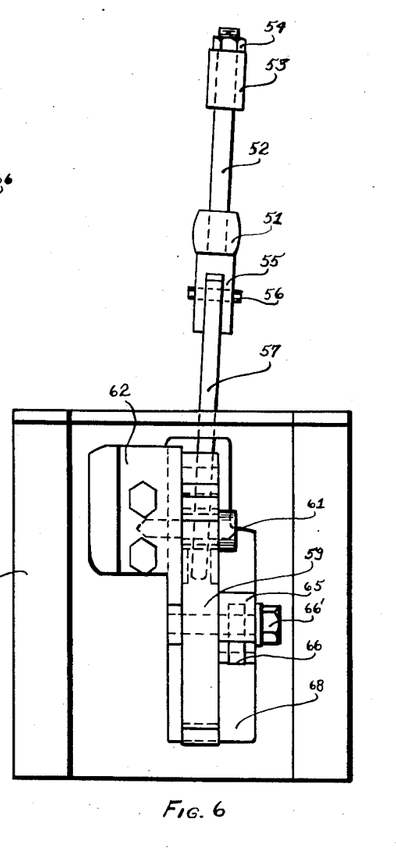
Figure 6 is a side view of the linkage arrangement shown in Figure 5.

Referring now to Figures 5 and 6 of the drawing, the arm 44 of the bellcrank 42 extends rearwardly of the staking and cut-off assembly and has a boss 50 on the extreme end thereof which is transversely apertured to rotatably receive the shank portion of an eye-like member 51. Slidably received in the aperture of the eye-like member is a rod 52 which is threaded on one end to receive a similarly threaded cap fitting 53 and a capping nut 54. The other end of the rod 52 is generally rectangular in shape and machined to form a U-shaped clevis 55 which is apertured to receive a pin 56 and pivotally support the upper end of a rectangular member 57. The lower end of the rectangular member 57 is pivotally connected to an arm 58 of a bellcrank 59 by means of an eyebolt 60. The bellcrank 59 is supported for limited rotary movement about an axis formed by a large bolt 61 which is threadably received in a laterally extending mounting block 62 which is attached to the main frame 24. The bellcrank 59 comprises another arm 63 which has an elongated aperture 64 therein to adjustably mount a fitting 65. A bolt and nut assembly 66' is provided for locking the fitting 65 in any desired position along the aperture 64 and as will be more readily apparent this mechanism serves as a means for adjusting the length of the intermittent feed of the strip of terminals.

The fitting 65 is formed into a clevis which pivotally mounts one end of an operating lever 66 by means of a pin 67. It will be appreciated that the linkage mechanism from the bellcrank 42 to the bellcrank 59 is generally directly behind the staking and cut-off assembly which allows the construction of a compact and rugged machine. The main frame 24 has an opening 68 in the side thereof through which a portion of the bellcrank 59 extends to expose the fitting 65 for accessibility in adjusting the length of feed for different shaped and sized terminals.

Figure 7:
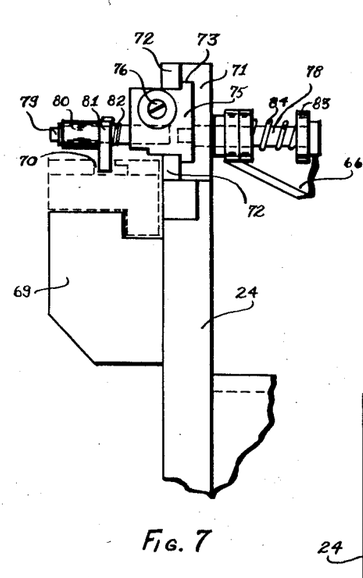
Figure 7 is an end view of the terminal feeding mechanism.

Mounted on the right side of the frame 24 generally below the pass line defined by the strip of terminals 16 is an irregular shaped anvil block 69 having a cross section as shown in Figure 7 of the drawing. This block is adapted to support a plurality of terminal guide members, such as shown by the broken lines in the drawing, of convenient and appropriate size for any given type of terminal being worked. These guide members preferably form a trough 70 through which the strip of terminals pass during the various operations of the machine of the present invention. The trough 70 extends generally from the right side of the machine to a point closely adjacent the welding station 22.

Secured to the frame 24 in upstanding relation behind the trough 70 is a U shaped guide 71 which has attached to the forward faces thereof parallel and separated members 72 which define ways 73. Slidably received in the ways 73 are a pair of T-shaped slides 74 and 75 which are adjustably separated from each other by means of a threaded rod 76. By proper manipulation of the threaded rod 76 the slide 74 can either be moved toward or away from the slide 75 to adjust the separation between these slides. A rod 78 is rigidly attached to the slide 75 and extends rearwardly thereof through an elongated aperture 77 in the U-shaped guide 71. Journaled on the rod 78 is the operating lever 66 for reciprocating the slides and suitable spacers 83 and a coil spring 84 are provided to insure coupled alignment between the rod 78 and the operating lever 66 at all times.

The slide 74 supports a rod 79 which extends over the pass line defined by the strip of terminals and the trough 70. The extreme outward end of the rod 79 receives a spacing cylinder 80 and journaled next to this member is a feeding finger 81 having a cammed shape substantially as shown which is adapted to engage the individual terminals of the strip at predetermined times and move the same toward the welding and staking and cut-off stations. The feeding finger 81 is continually urged in a downward direction by a spring 82 which has one end staked to the rod 70 while the other end thereof presses on the feeding finger 81 intermediate its ends. The arrangement is such that when the feeding finger is moved to the left as seen in Figure 5, the strip of terminals is caused to move one terminal length but, however, when the finger moves to the right this member is free to ride up over the ferrule portions of the terminals due to the specific shape of the finger in order that the strip of terminals may be intermittently moved toward the various working stations.

It will thus be appreciated that when the cylinder 49 is actuated to pivot the bellcrank 42 that the feeding and staking and cut-off operations of the apparatus will take place in an alternate manner. When the dies 33 are in operative relation with the strip of terminals, the feeding finger 81 will be returning to the right ready to feed another terminal to the various stations. In order to avoid buckling of the terminal strip it is necessary to insure that the staking and cut-off dies will be out of contact with the strip prior to the feeding of the same. This can be accomplished by providing a lost motion connection in the linkage utilized for reciprocating the slides 74 and 75 and the feeding finger 81 so that the dies 33 are at least partially retracted before the strip of terminals is moved. In the present instance the lost motion is afforded by the eye-like fitting moving on the rod 52 between the clevis 55 and the cap fitting 53.

Figure 8:
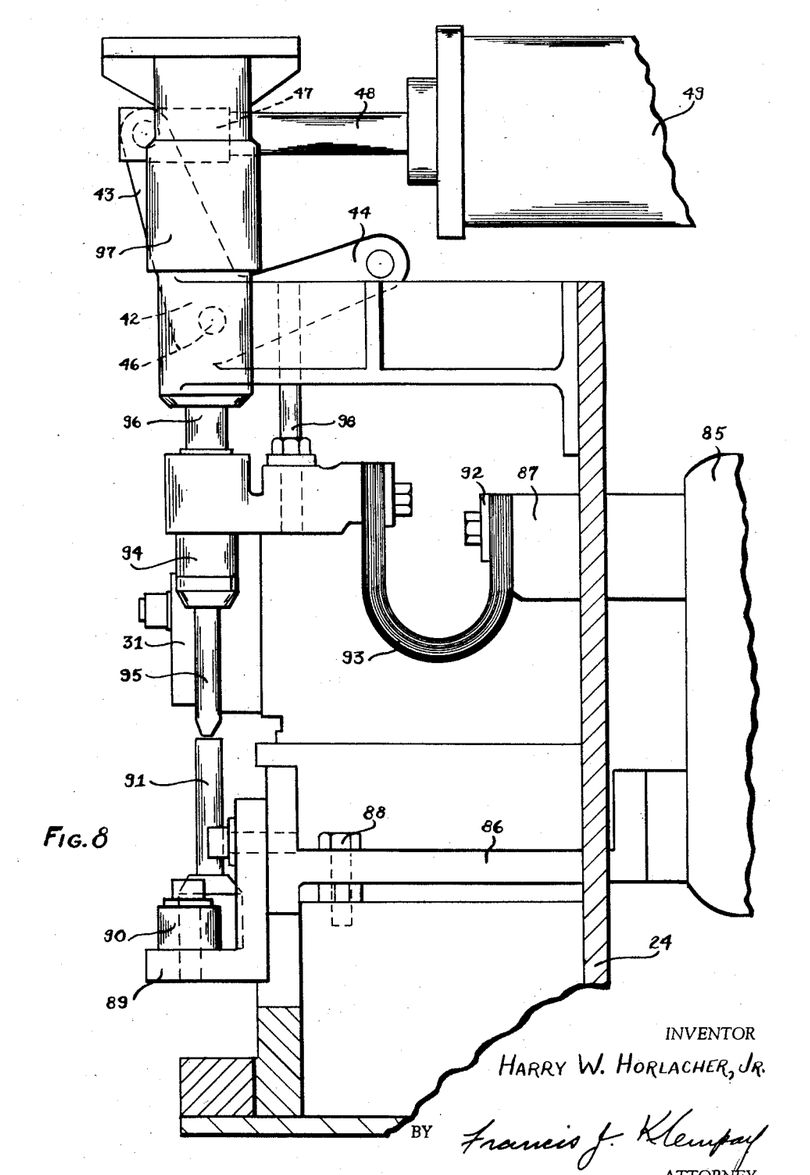
Figure 8 is a sectional side view showing specifically the construction and positioning of the welding equipment employed as seen from the section line VIII—VIII of Figure 1.

Considering now the equipment employed at the welding station 22 of the terminal welding and staking machine, it will be noted that the main frame 24 is recessed intermediate the feeding station and the staking and cut-off station to provide for the welding components. A transformer 85 is mounted to the rear of the frame 24 on suitable supports, not specifically shown, and has the forwardly extending secondary terminals 86 and 87. The transformer itself is a welding transformer of any well known type adapted to supply relatively high current and low voltage at its secondary terminals. The terminal 86 is bolted to the frame 24 at 88 and is attached to an L-shaped conductor block 89 which forms a bed or support for an anvil electrode holder 90 carrying a stationary or anvil electrode 91.

Clamped between the other terminal 87 of the transformer 85 and a plate 92 are flexible band conductors 93 that connect with an upper electrode holder 94 carrying the electrode 95. The upper electrode holder 94 is also attached to the bottom of a piston ram 96 of a fluid cylinder 97. It should thus be apparent that upon proper actuation of the fluid cylinder 97 with respect to the other operations of the apparatus that the upper electrode will move into pressure contact with a terminal and the anvil electrode and current may be supplied to weld a piece of wire to each of the terminals. To prevent rotation of the upper electrode the electrode holder 94 mounts a guide rod 98 which is adapted to ride in a bore provided in the frame of the machine as this electrode is vertically reciprocated.

Figure 3:
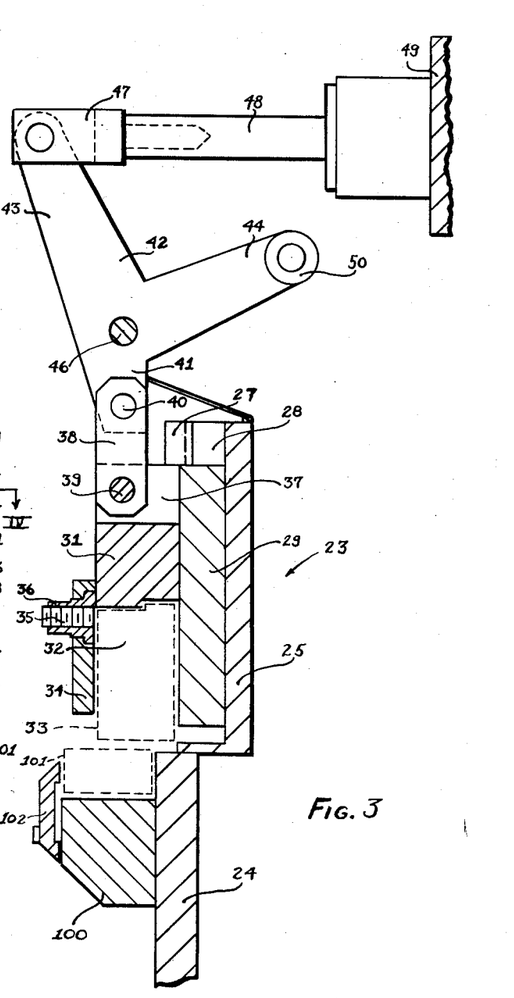
Figure 3 is a side sectional view taken along the section line III—III of Figure 2.
Figure 4:
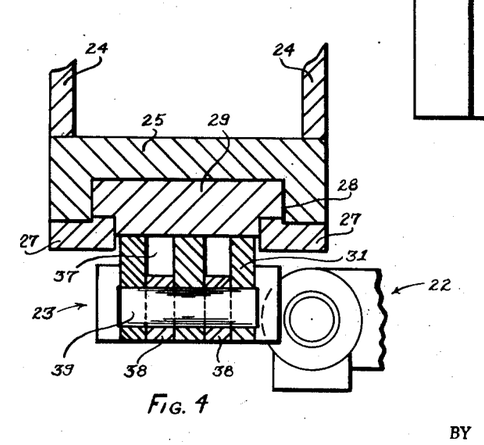
Figure 4 is a plan view taken along the section line IV—IV of Figure 2.

Referring again to the staking and cut-off assembly 23, there is mounted below the pass line of the strip of terminals 16 another irregular shaped anvil block 100 and this is best seen in Figure 3 of the drawing. The anvil block 100 is adapted to support a set of dies, represented by the broken line 101, which are complementary with the dies 33 carried by the die mounting block 31. A retaining plate 102 is provided to properly position and hold the dies 101 in proper relation on the anvil mounting block 100. As previously stated, the construction of the various dies and the guiding mechanism do not form a part of the present invention as obviously these component parts must be selected for any given type of terminal being worked and their construction is well known to those skilled in this particular art.

Various other instrumentalities of the present terminal welding and staking machine, as well as the control therefor, will best be understood with reference to the operation of the apparatus as described below.

A reel of terminals 14 is initially positioned on the axle 13 supported by the laterally extending bracket 12 and the strip of terminals 16 is unwound and hand-fed to the machine, at least to the point where the feeding finger 81 is operative to engage the terminals for feeding the same. The operator may then depress a suitable foot switch 103 (see Figure 11) to actuate a sequence timer shown schematically at 104. Such timers are well known in the welding art and any sequence timer adaptable for the terminal welding staking machine of this invention may be employed. The sequence timer 104 is interposed across supply lines L1 and L2 between the source of welding current and the welding transformer 85.

For the purposes of illustration, it will be assumed that the die mounting block 31 is initially in its most downwardly position and that the feeding finger 81 is substantially at the end of its return stroke and is ready to feed one terminal a predetermined distance. At the same time the movable electrode 95 is in its most vertically retracted position with the piston of the cylinder 97 being at the top of its stroke. The piston of the cylinder 49 will be at the bottom of its stroke for the conditions above described.

Figure 11:
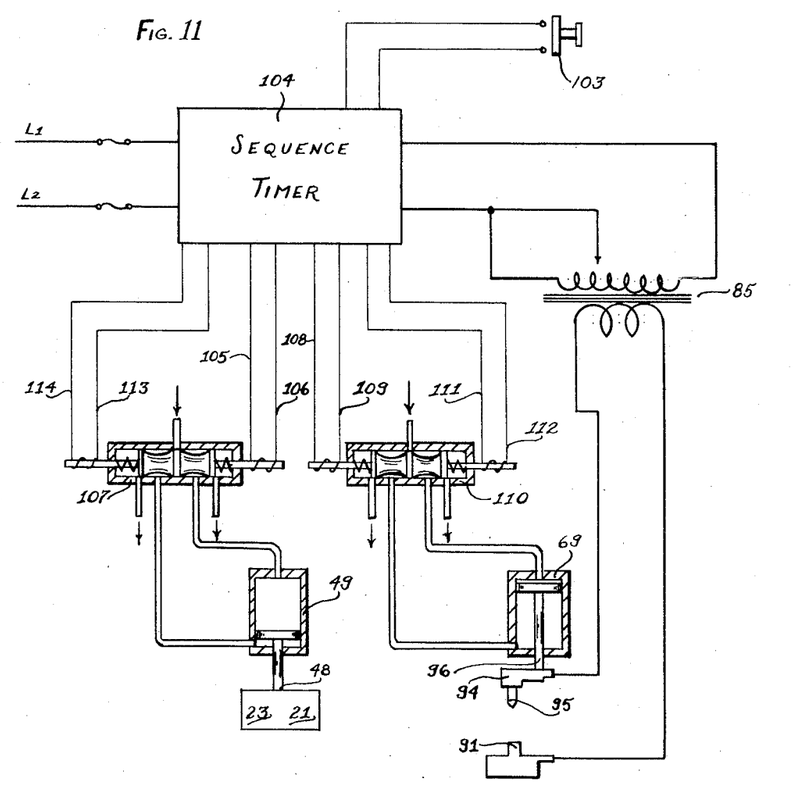
Figure 11 is a schematic representation of the various electrical and pneumatic controls utilized in the invention.

When the foot switch 103 is depressed the sequence timer 104 is actuated and after a predetermined time the timer supplies current through conductors 105 and 106 to energize a solenoid operated four way valve 107 in such a manner that fluid is caused to flow to the lower end of the cylinder 49 and be exhausted from the top thereof. The movement of the piston of the cylinder 49 causes the bellcrank 42 to pivot about the pin 46 in a clockwise direction thereby vertically retracting the die mounting block 31 and moving the feeding finger 81 to the left through various linkages hereinbefore described. The movement of the feed finger 81 causes the strip of terminals 16 to be moved one terminal length. After such operation the valve 107 is returned to its original position so that the cylinder 49 is effectively isolated from the source of fluid.

Shortly after the feeding has been completed, the sequence timer is operative through the conduits 108 and 109 to energize a solenoid operated valve 110 to supply fluid to the upper end of the cylinder 97 which causes the movable electrode 95 to move into pressure contact with a terminal, a piece of wire, and the anvil electrode 90. Of course, the piece of wire is inserted through the ferrule 18 of the terminal so that the exposed ends thereof covers the serrated portions 19 prior to the downward movement of the movable electrode. This may be conveniently accomplished by an operator positioned between the feeding station and the welding station since the strip of terminals is readily accessible between these two points due to the configuration of the machine. After the electrode has moved into proper pressure contact the welding operation may be completed by supplying current to the transformer 85. The electrical current is continually under the control of the sequence timer all in accordance with preferred welding practice in order to obtain the desired quality and consistency of weld. After the weld has been completed the four way valve 110 is actuated in the opposite direction through conductors 111 and 112 to retract the movable electrode 95 and free the strip of terminals 16 for further movement.

During the time that the welding operation is taking place, or shortly thereafter, the sequence timer 104 also actuates the valve 107 in the opposite direction through conductors 113 and 114 to extend the piston rod 48 of the cylinder 49 thereby moving the bellcrank 42 in a counterclockwise direction. This causes the die mounting block 31 to be lowered whereby the dies associated therewith are operative to firmly crimp the ferrule 18 around the piece of wire and separate the previously welded terminal from the strip thereby resulting in the finished terminal connector as exemplified in Figure 10 of the drawing. While the die mounting block 31 is moving in a downwardly direction the feeding finger 81 is caused to move to the right toward the reel 14 but the position of the strip is not changed since the finger is caused to move up over the ferrules on the terminals by virture of the cammed shape of this member.

Thus, a comptele cycle of operation of the machine has been completed. The sequence timer 104 may be of the type adapted to automatically start another cycle of operation as long as the foot switch is depressed. It will be apparent that the various steps in the operation of the terminal welding and staking machine may be carried out at extremely high rates of production and that all of the functions thereof are under the control of a sequence timer, it being practically impossible for the machine to misfunction.

As hereinbefore intimated, one of the advantages of the machine of the present invention is its versatility in handling different sized and shaped terminals. The time of actuation of the feeding and staking and cut-off assemblies and the welding mechanism can be accurately adjusted in the sequence timer of the apparatus. Since, however, the feeding and staking and cut-off assemblies are driven from the same source and are interdependent some means must be provided for adjusting one with respect to the other. The length of the feed of the feeding finger 81 can be accurately and precisely controlled by the position of the fitting 65 on the arm 63 of the bellcrank 59 since the position of this fitting with respect to the pivot bolt 61 determines the length of the feeding movement of the finger 81. It is noted that the bellcrank 59 protrudes through the frame 24 to expose the fitting 65 for ease of adjustment.

In addition to the above, the relative position of the feeding finger 81 with respect to the strip of terminals and the driving linkage therefor is adjustable. This may be accomplished by proper manipulation of the threaded rod 76 to adjust the distance between the slide 74 and the slide 75 and therefore the spacing of the feeding finger 81 from the far end of the operating lever 66.

The length of the feed may also be adjusted at several other places in the linkage mechanism employed. As an example, the cap fitting 53 and the capping nut 54 on the rod 52 can be positioned so that the length of the stroke is optimum for any given type of terminal being worked. Although this adjustment may be readily made, it should be understood the changes in the length of feed will preferably be made by properly positioning the fitting 65 on the arm 63 of the bellcrank 59 in the manner above described.

It should thus be apparent that I have accomplished the objects initially set forth by providing an improved and automatic terminal staking and welding machine. The apparatus is extremely versatile in that the same may be employed with many different sized and shaped terminals to attach pieces of wire to the same.

It is noted that the feeding and staking and cut-off mechanisms are driven from a common source through improved adjustable linkage means so that these two mechanisms are interrelated and there is substantially no chance of the same becoming unsynchronized or misfunctioning. Further, the machine of the present invention is of novel construction which allows close grouping of the welding and other appurtenant assemblies in a compact and rugged manner.

Although I have shown and described a specific representative embodiment of the invention, it should be apparent that many changes may be made therein without departing from the teachings thereof. Accordingly, reference should be had to the following appended claims in determining the scope of the invention.

I claim:

1. A terminal applying machine for attaching a piece of wire to each terminal in a strip of terminals which comprises a frame, means for rotatably mounting a reel of electrical terminals, means for intermittently feeding said strip of terminals, said means comprising a feeding finger reciprocably mounted on said frame adjacent the pass line of said strip of terminals and adapted to advance the same when said finger is moved in one direction, an operating lever operatively coupled with said finger for reciprocating the same, said lever being connected on its other end to one arm of a bellcrank, linkage means connected to the other arm of said bellcrank, said linkage means connected to an arm of a second bellcrank, a fluid cylinder, said fluid cylinder having an operating piston, and said piston being connected to a second arm of said second bellcrank whereby when said cylinder is actuated said feeding finger is caused to intermittently feed the strip of terminals.

2. Apparatus according to claim 1 further characterized in that said second bellcrank comprises a third arm, a pair of links pivotally connected to said third arm, said links pivotally connected on their other ends to a die mounting block, and said block being slidably mounted for vertical reciprocating movement on said frame above the pass line of the strip of terminals and adapted to carry staking and cut-off dies, the arrangement being such that said block is generally retracted when said feeding finger is operative to move the strip of terminals.

3. In a terminal applying machine of the type adapted to weld a piece of wire to each terminal in a strip of terminals comprising in combination means to intermittently feed the strip of terminals, means to apply a piece of wire to each of the terminals, means to crimp a portion of each terminal around the wire associated therewith, and means to separate the individual terminals from the strip of terminals; the improvement in said means to feed which comprises a member mounted on the frame of said machine adjacent the pass line defined by the strip of terminals, a pair of slides slidably mounted on said member, said slides being adjustably separated from each other, a feeding finger connected to one of said slides, and means connected to the other of said slides for reciprocating said slides and said finger to cause intermittent feeding of the strip of terminals.

4. Apparatus according to claim 3 further characterized in that said means connected to the other of said slides comprises an operating lever, adjustable linkage means connected to said lever, and driving means drivingly attached to said adjustable linkage means, the arrangement being such that the length of feed of said feeding finger may be adjusted.

5. Apparatus according to claim 4 further characterized in that said adjustable linkage means comprises a bellcrank having an elongated aperture in one arm thereof and pivotally mounted on said frame, a fitting adjustably received in said aperture, said fitting connected to said operating lever, said driving means comprising a fluid cylinder, and the piston rod of said fluid cylinder being drivingly connected with the other arm of said bellcrank, the arrangement being such that the length of feed of said finger may be adjusted by the position of said fitting in said elongated aperture.

6. A terminal welding machine for attaching a piece of wire to each terminal in a strip of terminals which comprises a frame, a feeding finger reciprocably mounted on said frame above the pass line defined by the strip of terminals and adapted to move the same when said finger is moved in one direction, an operating lever operatively connected to said finger and being generally parallel with the pass line of the strip of terminals, means for pivotally interconnecting one end of said operating lever and a first arm of a bellcrank, said bellcrank being pivotally mounted on said frame adjacent one side thereof and having a second arm and driving means connected with said second arm whereby upon proper actuation of said driving means said feeding finger is caused to reciprocate.

7. Apparatus according to claim 6 further characterized in that said means interconnecting said operating lever and said first arm of said bellcrank comprises a clevis-like fitting pivotally connected to said operating lever, an elongated aperture in said first arm, said fitting being releasably received in and adjustable along said aperture whereby the length of feed of said finger may be adjusted, and said first arm of said bellcrank at least partially protruding from said frame to allow ease of adjustment.

8. Apparatus according to claim 6 further comprising vertical linkage means interconnecting said bellcrank and said driving means including a second bellcrank pivotally mounted on said frame, said second bellcrank having a first vertical arm and a second horizontally extending arm, and said first arm being operatively connected with said driving means and said second arm being operatively connected with said second arm of said first bellcrank.

9. Apparatus according to claim 8 further characterized in that said linkage means interconnecting said bellcranks comprises lost motion means.

10. Apparatus according to claim 8 further characterized in that said second bellcrank comprises a third arm, a die mounting block, said die mounting block adapted for vertical siliding movement on said frame above the pass line of the strip of terminals and adapted to carry cut-off and staking dies, linkage means interconnecting said third arm of said bellcrank and said die mounting block, and said die mounting block being generally directly in front of said first bellcrank and said vertical linkage means interconnecting said first bellcrank and said driving means.

11. A terminal applying machine comprising a frame, a vertically reciprocable die mounting block, a reciprocable feeding finger, means to drive said die mounting block and said feeding finger, said last mentioned means comprising a bellcrank pivotally mounted on said frame, said bellcrank having a first arm interconnected with said die mounting block, said bellcrank having a second arm, linkage means interconnecting said second arm and said feeding finger, said bellcrank having a third arm, and power means connected with said third arm for pivoting said bellcrank to thereby reciprocate said feeding finger and said die mounting block.

12. Apparatus according to claim 11 further characterized in that said second and third arms are so angularly disposed with respect to said third arm and to each other that said die mounting block is retracted when said feeding finger is feeding a strip of terminals and vice versa.

13. A terminal applying machine comprising means for intermittently feeding a strip of terminals including a member mounted on said machine adjacent the pass line defined by the strip of terminals, a pair of slides slidably mounted on said member, said slides being adjustably separated from each other, a feeding finger carried by one of said slides, and means connected to the other of said slides for reciprocating said slides and said finger to cause intermittent feeding of the strip of terminals.

References Cited in the file of this patent
UNITED STATES PATENTS

| | | |
|---|---|---|
| 2,179,282 | Dawson | Nov. 7, 1939 |
| 2,244,006 | Harrington | June 3, 1941 |
| 2,631,213 | Martines | Mar. 10, 1953 |
| 2,711,466 | Marx | June 21, 1955 |